March 8, 1932. E. M. BROGDEN 1,848,309
APPARATUS FOR TREATING FRUIT AND THE LIKE
Original Filed Aug. 1, 1922   3 Sheets-Sheet 1
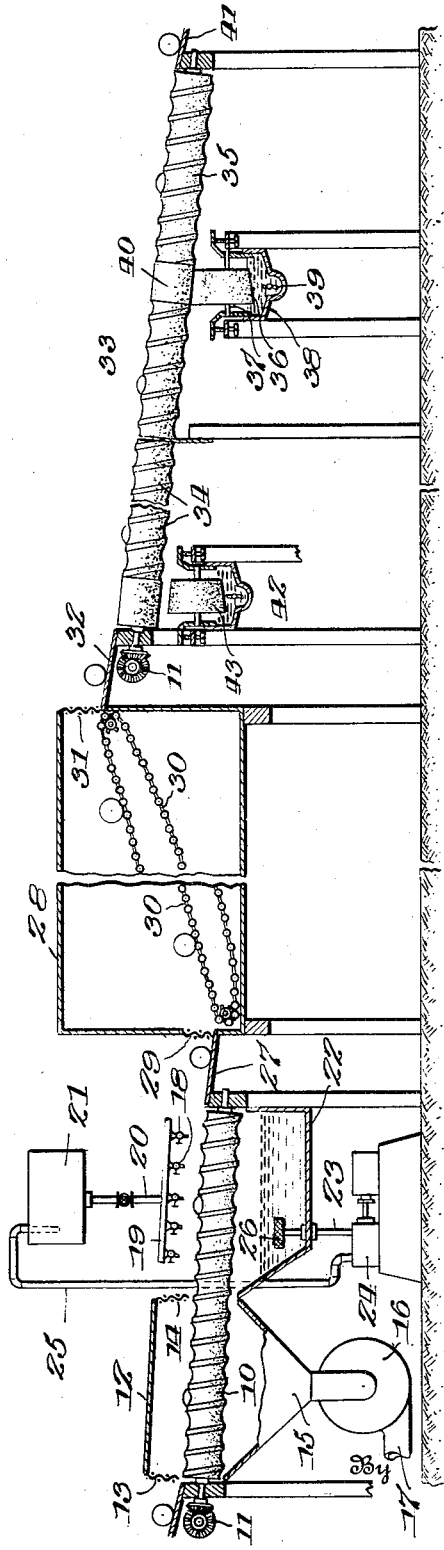
Inventor
ERNEST M. BROGDEN, March 8, 1932.  E. M. BROGDEN  1,848,309
APPARATUS FOR TREATING FRUIT AND THE LIKE
Original Filed Aug. 1, 1922  3 Sheets-Sheet 2
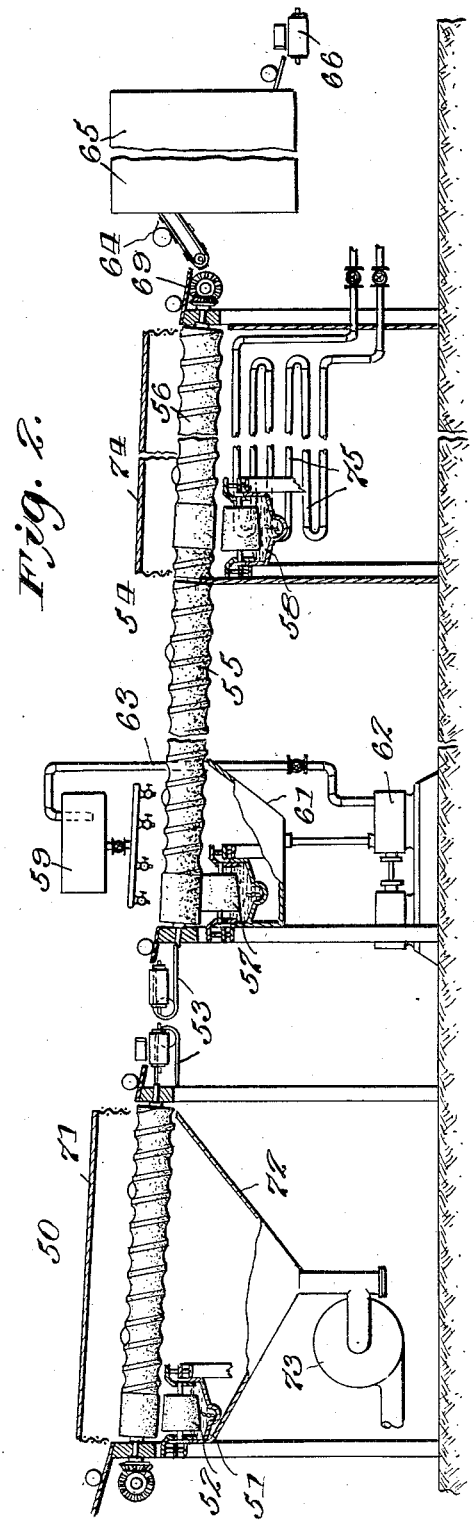
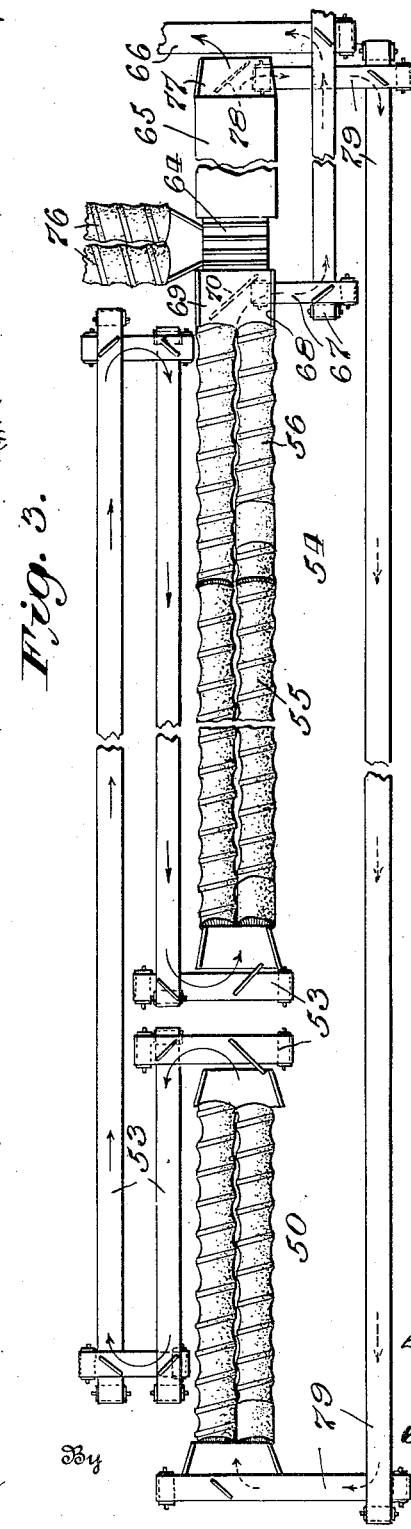
Inventor
ERNEST M. BROGDEN,

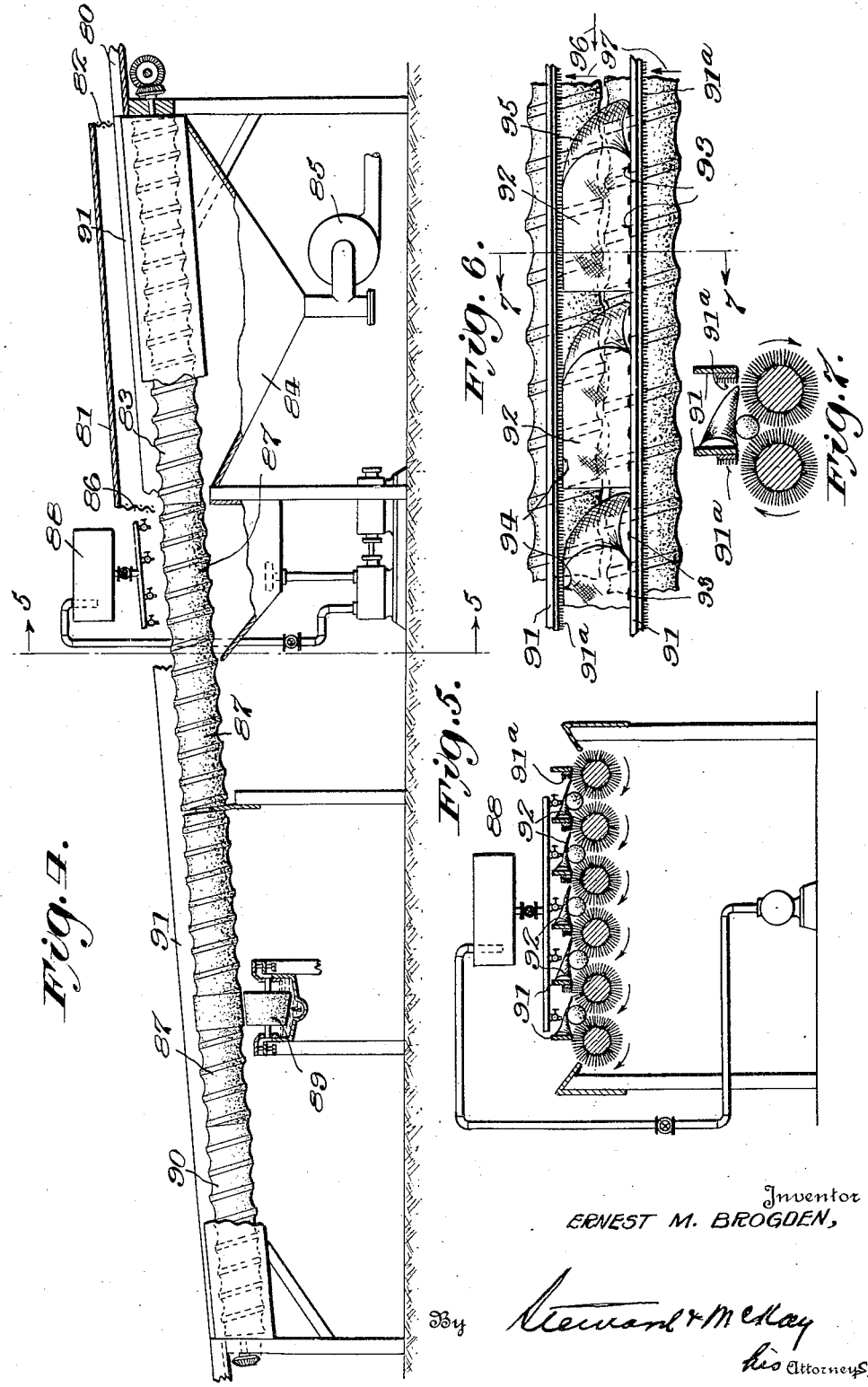

Patented Mar. 8, 1932

1,848,309

UNITED STATES PATENT OFFICE

ERNEST M. BROGDEN, OF POMONA, CALIFORNIA, ASSIGNOR TO BROGDEX COMPANY, OF WINTER HAVEN, FLORIDA, A CORPORATION OF FLORIDA

APPARATUS FOR TREATING FRUIT AND THE LIKE

Original application filed August 1, 1922, Serial No. 579,052. Divided and this application filed September 6, 1923, Serial No. 661,318. Renewed March 18, 1930.

This invention relates to apparatus for treating fruit and the like; and it relates more particularly to apparatus suitable for use in carrying out the novel process disclosed and claimed in my prior copending application Serial No. 579,052, filed August 1, 1922, of which the present application is a division. It is not to be inferred, however, that said apparatus is capable of use only in carrying out the particular process set forth in said prior application, which process is hereinafter referred to only as an example of how the apparatus may be used to advantage.

Practical forms of apparatus embodying the principles of the invention are shown more or less diagrammatically in the accompanying drawings, wherein Fig. 1 is a view in side elevation of an apparatus assemblage constructed and arranged in accordance with the invention, parts being shown broken away and in section;

Figs. 2 and 3 are views in side elevation and plan, respectively, of another arrangement of apparatus that can be used to special advantage in practicing the process under some conditions, parts of the apparatus being shown broken away and in section;

Fig. 4 is a view in side elevation of another type of apparatus in which means for performing a series of operations in the process are embodied in a unitary construction;

Fig. 5 is a transverse section on the line 5—5 of Fig. 4;

Fig. 6 is a fragmentary section showing details of a portion of Fig. 5; and

Fig. 7 is a fragmentary section on the line 7—7 of Fig. 6.

According to one embodiment of the novel process set forth in the my prior application aforesaid, fruit is first subjected to a dry brushing; is then washed with the aid of a relative light petroleum oil fraction, such as a highly refined kerosene-like fraction, for example, this washing medium being thoroughly rubbed all over the fruit; is then permitted to remain in a relatively quiescent state for a predetermined period of time to enable the oily medium to properly exercise its solvent or cutting action; and is then further rubbed and, most desirably, provided with a final coating of protective material.

Fig. 1 illustrates apparatus suitable for carrying out the novel process in the four-stage embodiment just outlined. At 10 are shown the conventional spirally formed rotary brush rolls of an ordinary fruit washer, said fruit washer being modified in accordance with the principles of this invention to adapt it for carrying out the novel process. Gearing for driving said rolls is indicated at 11. Approximately the upper or first half of the inclined rolls 10 is used in this instance as mechanical dusting brushes to carry out the first stage of the process. This upper portion of said rolls is enclosed by a cover or housing 12, into the upper end of which fruit can enter through a flexible closure 13 which may consist of a flap of canvas or the like, a similar flexible closure 14 permitting the fruit to leave the lower end of the housing. Dust and dirt fall into the hopper 15 and are drawn therefrom by exhaust fan 16 and discharged to any convenient place through pipe 17.

Approximately the lower half of the inclined rotary brush rolls 10 is used in the second stage of the process to assist in applying the non-aqeous washing medium to the fruit and to distribute the same thereover. Arranged above this lower portion of the inclined rolls 10 are a plurality of valved petcocks or other jet devices 18, connected by suitable pipes 19 and 20 with the tank 21 containing a supply of the washing medium. Fruit leaving housing 12 through the flexible exit 14 and continuing to travel down the runways provided by each pair of said rolls, of which there may be any convenient number, is at once thoroughly smeared with the washing oil through the action of the rolls which spin the fruit on varying axes and thoroughly brush and rub the surface thereof. The brushing surfaces of said rolls may advantageously consist of Tampico or other relatively stiff fiber of suitable character such as is commonly employed in fruit-washing machines. Any excess of the non-aqueous medium over what is required to thoroughly cover the fruit and to saturate the lower half of the rotary brushes 10 is received in a tank 22 from which it may be drawn through pipe 23 by pump 24, and returned through pipe 25 to the supply tank 21 for re-use. Access to the intake end of pipe 23 may be by way of a suitable strainer or filter indicated conventionally at 26.

The fruit after being dusted and then treated with solvent on the rolls 10, now rolls down the chute board 27 and enters a drier or solvent evaporator indicated conventionally at 28 to undergo the third stage of treatment, entry into said drier being effected through the canvas flap doorway 29. The drier here shown is a simple form of a standard type in common use for other purposes. The fruit travels rather slowly through the drier, being carried on the roller belt conveyor indicated at 30, and finally leaves through flexible exit 31. During this travel of the fruit through the drier chamber, it is not necessary, generally speaking, to subject the fruit to currents of air, the main object at this stage being to allow ample time for the washing oil to cut and loosen scale, smudge and the like that may be on the fruit. Accordingly, if the drier happens to be equipped with fans, as is usual, it is ordinarily not necessary to operate them in carrying out the novel process.

The fruit next rolls down over chute board 32 and is delivered to the upper end of inclined rotary brush roll apparatus indicated generally at 33 and enters the fourth stage of the process. The brushing surfaces of the upper portion of the brush rolls, indicated at 34, consists most desirably of relatively stiff bristles of fiber such as Tampico, while the lower portion 35 is of softer character, bristles of horsehair, or mixed horsehair and Tampico fiber, providing brushing surfaces for this lower portion of the rolls. During passage of the fruit down the runways provided by the rolls, of which there may be any suitable number cooperating in pairs in the usual manner, scale, smudge or the like, that has been loosened by the cutting action of the non-aqueous solvent in passage of the fruit through the drier, is dislodged and knocked off by the upper part 34 of the brushes. As the fruit strikes the lower section 35 of the inclined rolls, a mixture of a non-aqueous liquid and paraffin or other suitable preservative coating material is applied to it by means of a composition-applying device comprising, in this instance, a rotary applicator brush roll 36 carried upon vertically adjustable bearings 37 mounted on the walls of a tank or reservoir 38 containing said mixture. Suitably driven agitating means, indicated at 39, may be provided to maintain the composition properly mixed or emulsified. When the roll 36 is adjusted for engagement with the roll section 35, as illustrated, it is driven by said roll; and, dipping into the coating composition therein, it continually transfers portions of the latter to the brush roll sections 35, which rub it thoroughly over the fruit. The portion 40 of the roll section 35, with which the applicator roll engages, may advantageously be plain instead of spirally grooved.

The composition used in the applicator reservoir 38 may consist, in a typical instance, of about 45 to 55 parts of paraffine to about 55 to 45 parts of the aforesaid relatively light oil solvent used in the first stage of the process, parts being by volume.

The fruit finally leaves the lower end of the brush roll apparatus 33 and is discharged over chute board 41, either to a solvent evaporator (not shown) or, and more commonly, directly to the usual grading and sizing mechanism unnecessary to describe here.

It will be noted that by reason of the fact that the light washing oil employed in the first stage of the process is not excessively volatile, there need be comparatively little loss of solvent in passing through the chamber 28, and accordingly there is full opportunity at this stage for the solvent to exercise its proper function of cutting or dissolving tenaciously adherent foreign matter such as scale and smudge. However, by reason of the fact that the end or final boiling point of said light oil is comparatively low, sufficiently complete evaporation of said oil after the fruit has been delivered from the brush roll apparatus 33 takes place with reasonable promptness, whether or not such evaporation be hastened by passing the finished fruit through a solvent evaporator.

In the apparatus illustrated in Fig. 1, a second adjustable applicator device, designated generally at 42, which may be of the same type already described, is shown located adjacent the upper end of the brush rolls 34. When the apparatus is being used to carry out the process in the manner just described, the applicator device 42 remains idle. However, under some circumstances it may be desirable to alter the mode of procedure somewhat as, for example, where the character of the fruit is such that such change in procedure would be advantageous or convenient. For instance, if the fruit as received at the packing house is substantially free from scale, smudge, or other tenaciously adherent foreign matter, and is merely dusty, it is usually unnecessary to treat it with the pure washing oil or solvent before applying the mixture of paraffin and solvent. Accordingly, when such fruit is to be treated in the apparatus of Fig. 1, the adjustable applicator roll 43 of applicator 42 may be raised into engagement with roll section 34, while applicator roll 36 is lowered and remains idle. The pet-cocks or nozzles of the devices 18 may be closed and the pump 24 remains idle. The rolls 10 now merely serve as dry brushing or dusting rolls, and the roller conveyor 13 belt 30 serves merely as a convenient means for transferring fruit from the rolls 10 to the brush roll apparatus 33. Upon being delivered to the upper ends of the brush rolls of apparatus 33, the fruit is immediately daubed with coating composition transferred from the reservoir of applicator 42 to said brush rolls, and during the remainder of its travel down the runways between said brush rolls, said composition is thoroughly distributed and rubbed over the surface of the fruit, so that by the time it is discharged over the chute board 41, the fruit has received the desired thin film coating of protective material. In view of the fact that the fruit as it is delivered to the brush rolls of apparatus 33 is entirely free from solvent, under the conditions assumed, it is desirable that the composition employed in the applicator 42 be of somewhat thinner consistency than that described as used in applicator 36, 37, etc. The thinner composition may consist, for example, of say 35 to 40 parts of paraffin to 65 to 60 parts of the aforesaid light oil fraction or other suitable non-aqueous liquid; and in some cases a still thinner mixture is permissible.

Provision of the second applicator device 42 also adapts the apparatus for use in treating separated fruit, that is, fruit that has been run through a separator to separate it from frozen fruit. The separators in common use employ water as a flotation medium, and accordingly economical handling of such fruit practically makes it necessary to wash it with water since it is already wet. In order to treat such fruit in the apparatus shown in Fig. 1, the non-aqueous washing medium contained in the tank 22 can be replaced by water which is pumped through the pet-cocks 18 and sprayed upon the fruit as it passes down over the lower sections of rolls 10. The wet fruit is then delivered to the apparatus 28 which may be operated under these circumstances as a regular drier or evaporator, air being blown in the usual manner upon the fruit as it is carried through the apparatus by the roller conveyor belt 30. After it passes through the drier, the fruit is then delivered as before to the brush roll or polisher mechanism 33 where a preservative coating composition is applied to it through the agency of applicator 42. Applicator 36 remains idle under these conditions.

It will be seen therefore that the apparatus arrangement shown in Fig. 1 and above described is very convenient from the standpoint of ready adaptation for treatment of fruit in different ways as may be required.

In another practical embodiment of my invention I may make use of the novel apparatus arrangement shown more or less diagrammatically in Figs. 2 and 3. The apparatus shown in these figures is especially advantageous because of the fact that, like the apparatus previously described, it is readily adaptable or convertible to handle fruit of different character or condition upon short notice, and also because it lends itself particularly well to installations where for any reason it is necessary or desirable to utilize previously installed fruit-handling units to the fullest extent possible. At the same time, the essential parts of this system can be installed, without reliance upon previously installed apparatus, at minimum cost. Furthermore, the floor space required is much less than that required by fruit-handling systems heretofore used.

Generally described, the apparatus of Figs. 2 and 3 involves an arrangement analogous to that of Fig. 1 in that it comprises a unit for cleansing fruit, partially or completely, without the use of water; a second unit, which may be called the delay unit, receiving fruit from the first unit and normally maintaining the same in a relatively quiescent condition for a predeterminable period of time; and a third unit in which any necessary further cleansing of the fruit may be accomplished and in which the fruit receives what may be called a finishing treatment so far as application of the preservative coating composition is concerned. From the apparatus comprising these three principal units, the fruit may optionally go through a drier unit for partial or substantially complete removal of residual volatile solvent present in the preservative coating the fruit then passing from said drier unit to the usual grading belt or other device for grading fruit, and then to sizing apparatus. However, in many cases, the employment of the drier unit is not essential, and it is an important feature of the invention that the fruit as discharged from the third unit above referred to may go direct to the grading belt without passing through said drier unit. The arrangement shown and hereinafter to be more particularly described is especially advantageous because, among other things, it can be adapted with exceptional facility for use for where for any reason it may be desired in a particular instance to use water in washing the fruit. Under such circumstances, provision is made whereby the fruit, after being handled first in the usual fruit-washer employing water, is delivered to the drier unit aforesaid; is then delivered to the first unit above described which now serves, not as a cleansing unit, but as a composition-applying unit; passes thence to the second unit where more or less evaporation of the hydrocarbon or other solvent employed may take place; goes thence to the third unit for the finishing treatment; and finally passes from said third unit to the grading belt. In handling water-washed fruit, it is also possible to cut out either the first or third unit, and also the second or delay unit.

Referring now to the details of the apparatus shown in Figs. 2 and 3, 50 designates generally the first unit above referred to, this unit comprising inclined rotary brush roll apparatus of the so-called polisher type and comprising in practice any suitable number of parallel inclined spirally grooved rotary brush rolls, but here illustrated for simplicity as consisting of two such rolls cooperating to provide a single fruit runway. This first unit is adapted and normally used, when the fruit is merely dusty and does not carry scale or smudge, to clean the fruit merely by dry brushing or dusting the same. On the other hand, when the fruit is also scaly or smudged, this unit can be operated to cleanse the fruit with the aid of a non-aqueous liquid medium consisting either of a non-aqueous solvent such as kerosene or other suitable light oil alone, or a mixture thereof with a suitable proportion of preservative coating material such as paraffin. In order that the latter method, that is, washing with a non-aqueous liquid medium, may be employed if desired, the unit is provided with an applicator indicated generally at 51, of which the applicator roll 52 is adjustably mounted so that it can be moved into or out of engagement with one or more of the superadjacent brush rolls, the arrangement being similar in all essential respects to the applicators described in connection with Fig. 1. If a mixture of paraffin and solvent is used as the washing medium, which sometimes offers practical advantages over cleansing with the solvent alone, the mixture should ordinarily be comparatively thin. A typical mixture that can be effectively used in container 51 for this purpose comprises 20 per cent by volume of paraffin and 80 per cent by volume of a liquid hydrocarbon such as kerosene or other suitable light oil. In a typical installation, the brush rolls of this cleansing unit 50 may be about 5 or 6 feet long, their brushing surfaces consisting of mixed bristles of horsehair and Tampico fiber in about equal proportions.

Fruit leaving the first unit passes to the conveyor belt system indicated generally at 53, said system being such as to convey the fruit over a circuitous route whereby a predeterminable period of time may elapse before the fruit is delivered to the third or finishing unit indicated generally at 54. The propelling mechanism for said conveyor belt may be adjustably geared for operation at any one of several different predetermined speeds in order that said period of time may be altered to suit different conditions. The conveyor belt unit 53 delivers the fruit to the aforesaid finishing unit 54 which is similar in general character to the first unit, 50, in that it consists of inclined parallel spirally grooved brush rolls which, however, are most desirably considerably longer than the brush rolls of unit 50. The first or upper portion 55 of the brush rolls of unit 54 are best provided with relatively stiff brushing surfaces and therefore can in practice be composed of Tampico fiber bristles. The second or lower portion, indicated at 56, and comprising in this instance about a third of the length of the entire rolls, is desirably of softer character and may consist, for example, of mixed bristles of Tampico fiber and horse-hair as before described. The entire length of the brush rolls of this unit 54 may be approximately 12 feet in a typical instance; although it is to be understood that all dimensions herein referred to are susceptible of variation without departing from the scope of the invention. For a reason that will appear presently, it is desirable to provide the unit 54 with two applicator adjustable devices 57 and 58 of the same general type as that employed with unit 50 previously described. The first of these in sequence, that indicated at 57, is best located substantially at the upper end of the inclined brush rolls of the unit; while the other, 58, is advantageously located adjacent the lower end of the Tampico fiber section 55 of the rolls just in advance of the softer brush sections 56. For a purpose that will presently appear, the unit 54 may also be advantageously provided with means for showering washing oil down upon the fruit as it travels along the brush rolls adjacent the upper or receiving ends thereof. For this purpose a pump and spray system, similar to that employed in conjunction with the brush rolls 10 of Fig. 1, may be used, such system being here shown as including supply tank 59, valved nozzles or pet-cocks 60, drip-tank 61, pump 62, and return-pipe 63.

From the lower or delivery end of the finishing unit 54, the fruit may follow either one of two paths. It may go by way of elevator 64 to drier 65, which may be of the well known roller-belt conveyor type; and thence to the grading belt 66 from which the graded fruit goes to sizing apparatus, not shown. Alternatively, and in many cases preferably, the fruit leaving unit 54 does not go through the drier but passes directly by way of conveyor belt 67 to the grading belt 66 before mentioned, the arrangement being such that fruit can be delivered either to the elevator 59 or to the belt conveyor 67, as desired, with very slight adjustment of the mechanism in question. For example, the side 68 of chute board 69 may be removable and a deflector 70, shown in dotted lines placed on said board to divert fruit to belt 67 and thus by-pass the drier.

Assume now that fruit, such as oranges or the like, that is merely dusty but carries no tenaciously adherent foreign matter such as scale, smudge, or the like, is to be treated in the apparatus system shown in Figs. 2 and 3. Such fruit will ordinarily not require cleansing with a non-aqueous liquid medium but requires only to be thoroughly rubbed or brushed to sufficiently free the rind or skin of dirt. Accordingly, applicator roll 52 is lowered and remains idle. The applicator roll of device 57, however, is adjusted for engagement with one or more of the brush rolls of unit 54 in order that a coating composition, comprising wholly or chiefly a mixture of paraffin or the line and a non-aqueous vehicle such as the light oil fraction before mentioned, for example, may be applied to the upper end of said brush rolls. Such mixture may be of medium thick consistency, say 45 to 55 per cent paraffine by volume. The applicator roll of device 58 is lowered and remains idle under the conditions assumed. Fruit as received at the packing house is delivered to the upper end of the inclined roll of unit 50 and is thoroughly rubbed and brushed as it passes down along the rolls with the result that it is freed from dust and other foreign matter to the necessary extent. Most desirably the unit 50 has a housing 71 and collecting hopper 72 from which a fan 43 draws dust and dirt and discharges same to any convenient point; all substantially as described in connection with the rolls 10 shown in Fig. 1. The dusted fruit delivered from unit 50 may then pass by way of the conveyor 53 to the finishing unit 54; although, if desired, a suitable chute or bridging device, (not shown) may be interposed between units 50 and 54 to enable direct delivery of the fruit to unit 54 without its having to travel the circuitous route provided by conveyor 53. In either case, the fruit upon being delivered to unit 54 is immediately smeared with the more or less fluid coating composition applied to the brush rolls through the agency of the applicator device 57, and this composition is thoroughly and uniformly distributed over the fruit as it passes down the runway or runways between the brush rolls, the lower sections 56 of which serve to finish and smooth the film-like coating on the fruit and to wipe off any unnecessary surplus. If the fruit delivered from unit 54 is passed through the drier 65, a certain amount of the hydrocarbon or other solvent undergoes evaporation therein, after which the fruit is delivered to the grading belt 66, as before stated. On the other hand, if the fruit is delivered by unit 54 to the conveyor belt 67, a certain amount of evaporation may occur while the fruit is traveling on said belt and before it reaches the grading belt. In either case, the extent of evaporation will depend largely upon the volatility of the hydrocarbon or other non-aqueous solvent employed; and, in the case of a solvent such as the special oil fraction hereinbefore described, or a solvent having similar desirable properties, it is not essential, as already pointed out, that complete evaporation be effected before the fruit reaches the grading belt.

Where the fruit carries considerable foreign matter that adheres firmly to the fruit rind or skin, as in the case of scaly or smudged fruit, the best procedure is to treat the fruit immediately with a non-aqueous cleansing medium and then, after the lapse of a suitable interval of time, to complete the cleansing and then finish the preservative treatment. Accordingly, where the apparatus of Figs. 2 and 3 is employed to accomplish this, applicator roll 52 is raised into engagement with the brushing rolls of unit 50 in order to transfer thereto the non-aqueous medium. The applicator roll of device 57 is lowered out of engagement with brush roll section 55 and remains idle; while the applicator roll of device 58 is raised into engagement with the brush roll section 56 in order that a fresh supply of coating material may be supplied to said rolls to provide a finishing coat on the fruit. Under these conditions the fruit to be treated receives a liberal coating of the non-aqueous washing medium in going through the unit 50, a certain amount of paraffin being most desirably mixed with the light oil to provide a thinly fluid washing medium as already described. This mixture is smeared and rubbed thoroughly over the fruit by the brushes of unit 50, and the fruit is then delivered to the conveyor belt 53 upon which it rests quietly and by which it is conveyed and delivered eventually to unit 54. The period of time elapsing between the exit of the fruit from unit 50 and its delivery to unit 54 may vary considerably depending upon the character and dirtiness of the fruit; but in a typical instance it amounts to about seven minutes. During this time the kerosene or other solvent employed has an opportunity to cut or dissolve the foreign matter on the fruit rind so that it is easily removable by the relatively stiff fiber bristles of the upper brush-roll sections 55 of unit 54. Where the fruit is very dirty, it is of advantage to shower it with washing oil, or a thin mixture thereof with paraffin, just as it begins its travel down the brush rolls of unit 54. This often materially facilitates complete cleansing of the fruit by said rolls. By the time the fruit arrives at the lower end of brush roll section 55, it is clean and bright. Under the conditions of operation assumed, it also retains a thin coating or film of paraffin admixed with more or less solvent; and in fact further application of preservative material is not necessary in all cases, strictly speaking. However I have found it advantageous in most instances to apply more coating composition at this point and this can be conveniently effected by means of the applicator device 58, the applicator roll of which has been placed in engagement with the brush rolls under the conditions assumed. The fresh coating composition thus applied at this stage, which may advantageously be of relatively thick consistency, is thoroughly wiped and uniformly distributed over the surface of the fruit by the action of the lower brushing sections 56 which are softer or more yielding than the sections 55, as already explained. The course of the fruit after leaving the unit 54 may be either through the drier or direct to the grading belt, as in the previous example given.

If desired, the lower brush roll sections 56 may be enclosed in a housing 74 in which are provided suitable heating means, such as steam coil 75, for example, whereby the final or finishing rubbing of the coated fruit may be conducted at a temperature above atmospheric. In a typical instance the temperature in the housing may be 130°–140° F. This aids in obtaining a very thin uniform coating of paraffin on the fruit, and also enables a higher polish to be obtained. This is attributable in part to the fact that when heat is used, the brushes 56 stay cleaner and therefore have a more efficient wiping and rubbing action on the fruit.

It may be noted that when any of the applicator devices are idle, they can be removed from under their respective brush rolls, provision being made for accomplishing this readily.

The application of coating material to the fruit at two different stages as in the example just given, that is, first by the applicator device 51—52 in connection with the preliminary cleansing, and second by the applicator device 58 after completion of the cleansing, has certain very important advantages. I have found that the paraffin contained in the tin mixture applied to the fruit in unit 50, aside from any other advantageous influence it may have, fills or seals the pores of the fruit skin or rind in such manner that the fruit is at once provided with a protective coating of the inert or inactive paraffin which is effective to render the fruit substantially insensitive or unaffected by coating or preservative agents that may subsequently be applied, but which would in some cases have an injurious or deteriorating effect upon the fruit if it were applied thereto directly without the interposition of the inert paraffin coating. This makes it possible to employ in the applicator device 58 a coating composition that includes ingredients, such as rosin or the like, adapted to enhance the finish or polish produced on the fruit in the finishing operation without fear of adversely affecting the fruit thereby. It also enables the use in such coating composition of a solvent of much higher volatility, such as gasoline or the like, than it is ordinarily advisable to use in the first application of coating composition to the fruit. This is of some practical importance where it is deemed desirable in a particular instance to more rapidly or completely free the preservative coating from solvent before it goes to the grading belt. It is to be observed that this result is due not merely to the higher volatility of the second or lighter solvent per se, but also to the fact that, in evaporating, the more volatile solvent mechanically carries off with it a substantial portion of the residual heavier solvent previously applied to the fruit.

If for any reason it may be desired to wash fruit with water, the fruit coming from the brush rolls of an ordinary standard water washer, indicated conventionally at 76, is transferred by elevator 64 to the drier 65, through which it passes and is discharged by way of chute board and deflector 78 (shown in dotted lines) to conveyor belt system 79 which carries it to the head or upper end of unit 50, the fruit then being handled by units 50, 53 and 54 as already described for the handling of relatively clean fruit, that is, applicator 57 being used with a mixture of medium consistency, the other two applicators being idle, and the fruit discharged from unit 54 being diverted by deflector 70 to conveyor belt 67 which takes it to the grading belt. Or, water-washed fruit carried from the drier by belt 79 may be taken directly to the head of unit 54 without being handled by units 50 and 53. Again, the fruit coming from the drier may go to unit 50 and then be diverted from the discharge end thereof direct to the grading belt without going through units 53 and 54; but in that case applicator 51—52 is used to apply the coating composition to the fruit.

The form of apparatus illustrated in side elevation in Fig. 4 is also convenient for use in practicing my novel process of waterless washing and also coating fruit, especially when the fruit is not excessively dirty. In this arrangement, all the necessary operations can be effected in proper sequence by means of a unitary brush roll construction which, in its general character, is similar to ordinary washers and polishers but is much elongated and is equipped with accessory parts that render it operative to carry out the process aforesaid. Fruit as delivered to the packing house is fed over the chute board 80 to the upper end of the inclined brush roll mechanism and enter the dust housing 81 through flexible entrance 82 passes down along the first or dusting section 83 of the brush rolls, the brushing surfaces of which are desirably of mixed Tampico fiber and horsehair. This section may be 5 to 6 feet long in a typical instance. Dust and dirt fall into hopper 84 and are withdrawn and discharged by fan 85. Leaving the dusting section through flexible exit 86, the fruit next passes over a brush roll section 87 that is relatively long, say 10 to 12 feet, and most desirably composed of Tampico fiber. Just as the fruit enters this section, a washing oil is showered upon it by the spray system indicated generally at 88 and similar to those described in connection with the apparatus Figs. 1, 2 and 3. After being thus showered with solvent, the fruit continues to travel down along this Tampico fiber section, being turned over and over and thoroughly rubbed and scrubbed meanwhile. After an interval of time during which the oil has a chance to cut and loosen scale and smudge, which is dislodged and thrown off the fruit by the brushes to a considerable extent, the fruit arrives at the lower part of section 87, and a quantity of a fairly thick mixture of paraffine and light mineral oil, which may be the same as the oil used for washing, is applied to the fruit through the operation of applicator device 89, which may be like those already described. As the fruit continues on down the rolls and through the third or finishing brush roll section 90, which is relatively short, say 4 or 5 feet for example, and composed of mixed Tampico and horsehair, it gets a thorough wiping and rubbing that removes the loosened scale etc., along with any excess coating composition; so that when the fruit leaves the lower end of the apparatus, it is bright and clean and has a thin film coating of paraffine. The fruit may either go direct to the grading belt or first through a solvent evaporator, as desired.

Figs. 5, 6 and 7 illustrate in detail means for ensuring that the fruit as it passes down the runways between the cooperating brush rolls shall be compelled to change its axis of rotation continually and shall receive a thorough rubbing or scrubbing in its travel. As shown in Fig. 5, the brush rolls all rotate in the same direction. Above each brush roll and located in a vertical plane slightly off-center, that is, beyond the vertical plane passing through the brush roll axis, is stationarily mounted what may be called a dividing board or guard 91 extending in the present instance the full length of the brush roll and parallel thereto. On the side of the dividing board toward which the upper surface of the brush roll advances, that is, on the left hand side as shown in Fig. 5, each dividing board is provided near its lower edge with a brushing surface 91$^a$ of suitable bristles. Attached along the lower edge of the opposite or right hand side of each of these dividing boards are a series of flap devices 92 of suitable flexible material of some kind, heavy textile material such as canvas belting being suitable for this purpose. As shown more clearly in Fig. 6, these flap devices 92 are arranged in series along the length of the runway formed by each cooperating pair of brush rolls, each flap overlying the runway and having one edge tacked or otherwise secured to the smooth face of a separating board 91 along its lower edge as indicated at 93, while the other edge 94 is entirely free save that the free corner 95 of the advance or upper end of each flap is turned back across the runway and tacked or otherwise secured to the plain side of the cooperating separating board 91 but near the upper edge of the latter. By advance or upper end of the flap is meant the end toward the upper end of the inclined brush rolls, or the end of the flap toward which the fruit advances as it travels down the rolls. In Fig. 3 the direction of fruit travel is indicated by the arrow 96 and the direction of roll rotation by the arrow 97. It will be seen that the rotation of the rolls tends to keep the flap extended across the runway with its free edge closely adjacent the brush surface 91$^a$ of the next succeeding separating board; while the turned-back corner 95 of the upper end of the flap allows fruit coming down the runway to get under the flap. Furthermore, the turning back of the flap corner 95 exerts a certain amount of yielding pressure on the flap lying over the runway, the extent of this pressure depending upon the stiffness of the flap material and the extent to which the corner is turned back, this latter factor providing means for regulating or adjusting the flap pressure on the fruit. The flaps in each runway are arranged in fairly close succession with but little space between any two flaps. The described arrangement operates substantially as follows: A fruit such as an orange coming down the runway is advanced under the upturned corner of the flap by the action of the spirals on the brush roll. The pressure of the flap on the fruit acts like a brake to check the spinning of the orange which is imparted to it by the rotation of the cooperating brush rolls and which has a tendency to occur principally on a single axis passing more or less approximately through the stem and blossom end of the fruit. This braking action causes the orange to climb the right hand brush roll, viewing the fruit as it travels down the runway from a point of observation higher up along the brush rolls. The orange climbs the right hand brush roll until it strikes the stationary brushing surfaces 91$^a$ of the next succeeding dividing board or guard which prevents the orange from leaving the runway. By this time the orange is substantially at the crest of the brush roll and is held there by the action of the flap. The brush roll, however, continues to advance the orange longitudinally of the runway, and this, in conjunction with the retarding action of the stationary brush surface 91$^a$ on the orange, changes the axis of rotation thereof and ensures its getting a thorough rubbing and scrubbing. When the orange reaches the lower end of the flap, the pressure on it is momentarily released and it drops back down into the valley between the brush rolls forming that runway; but it then goes under the upturned corner of the next succeeding flap 92 and is again compelled to climb the right hand brush roll as before described. It is to be noted that the flaps, besides compelling the fruit to climb the brush roll as described, themselves also exercise a rubbing action on the fruit. If, as may sometimes happen, the fruit crowds down the runway so fast that an occasional fruit fails to get under the upturned corner of a particular flap, this does no harm because such fruit simply travels down above the flap and subjects the fruit below the same to an additional and variable braking pressure which is advantageous rather than otherwise. The arrangement here shown and explained therefore provides particularly efficient means for securing effective brushing and rubbing action on the fruit, and the same constitutes an important feature of the invention in its more specific aspects.

While the described arrangement of separating or dividing boards and pressure flaps has been described more particularly in connection with the apparatus shown in Figs. 4, 5 and 6, it may advantageously be used in the previously described types of apparatus illustrated in Figs. 1, 2 and 3, and is actually so used in practice. Said arrangement is not illustrated in Figs. 1, 2 and 3 in order to avoid complicating those drawings.

It will be understood that the invention is not limited to the details of apparatus hereinbefore disclosed but is broad in scope, contemplating a wide variety of changes that it is evidently possible to make without departing from the fundamental principles upon which the invention is based.

What is claimed is:

1. Apparatus for treating fruit comprising, in combination, mechanism for applying substantially liquid treating material to fruit and rubbing the fruit therewith, means for recovering excess of said material and returning same to such applying mechanism, means arranged to receive fruit from said mechanism, and mechanism for further rubbing said fruit, to which latter mechanism fruit is delivered by such receiving means after a predetermined period of time has elapsed after receipt from the first-mentioned mechanism, said receiving means being arranged to prevent direct delivery of fruit from the first-mentioned mechanism to the second-mentioned mechanism, for the purposes set forth.

2. Apparatus for treating fruit comprising in combination, two rotary brush roll units, each equipped with means for applying a substantially liquid treating material to fruit, and a conveyor unit arranged to receive fruit from one brush roll unit and deliver it to the other brush roll unit after a predetermined delay, said conveyor unit being arranged to prevent direct delivery of fruit from the first mentioned brush roll unit to the second, for the purposes set forth.

3. Apparatus for treating fruit comprising, in combination, a rotary brush roll unit equipped with an applicator device, conveyor means to which said unit delivers fruit, and a second rotary brush roll unit equipped with an applicator device, said conveyor means being arranged to prevent direct delivery of fruit to said second unit and to deliver it thereto only after the lapse of a predetermined interval of delay from the time such fruit was received from the first unit, for the purposes set forth.

4. Apparatus for treating fruit comprising, in combination, a rotary brush roll unit equipped with an applicator device, conveyor means to which said unit delivers fruit, and a second rotary brush roll unit equipped with an applicator device, said conveyor means being arranged to prevent direct delivery of fruit to said second unit and to deliver it thereto only after the lapse of several minutes from the time such fruit was received from the first unit, for the purposes set forth.

5. Fruit treating apparatus comprising in combination, a pair of rotary brush rolls both rotating in the same direction and cooperating to provide a fruit runway, through which fruit travels longitudinally of the rolls, a member extending longitudinally above each brush roll and parallel therewith, and a plurality of flexible friction devices secured to one such longitudinally extending member and overlying said runway, said devices being arranged to present friction surfaces to fruit at spaced intervals along said runway and thereby to exert a non-uniform braking action on such fruit.

6. Fruit treating apparatus as set forth in claim 5, wherein each said flexible friction device consists of a flap of canvas or the like secured along one edge to one longitudinally extending member with its other edge lying adjacent the other longitudinally extending member, and having one corner turned back and fastened to the first mentioned longitudinally extending member, substantially as described and for the purposes set forth.

In testimony whereof I hereunto affix my signature.

ERNEST M. BROGDEN.